United States Patent
Achacoso et al.

[11] Patent Number: 6,161,149
[45] Date of Patent: Dec. 12, 2000

[54] CENTRIFUGAL COMMUNICATION AND COLLABORATION METHOD

[75] Inventors: Theodore B. Achacoso; D. Wayne Silby, both of Washington, D.C.

[73] Assignee: GroupServe, Inc., Arlington, Va.

[21] Appl. No.: 09/041,599

[22] Filed: Mar. 13, 1998

[51] Int. Cl.[7] .......................... G06F 13/38; G06F 15/167
[52] U.S. Cl. ........................ 710/4; 709/203; 709/204; 709/206; 711/164; 713/202
[58] Field of Search ................... 709/201–206; 711/164; 713/202; 710/4

[56] References Cited

U.S. PATENT DOCUMENTS

| | | | |
|---|---|---|---|
| 5,632,018 | 5/1997 | Otorii | 709/200 |
| 5,675,507 | 10/1997 | Bobo, II | 709/206 |
| 5,694,546 | 12/1997 | Reisman | 705/26 |
| 5,790,790 | 8/1998 | Smith et al. | 709/206 |
| 5,790,793 | 8/1998 | Higley | 709/218 |
| 5,796,393 | 8/1998 | MacNaughton et al. | 345/329 |
| 5,813,007 | 9/1998 | Nielsen | 707/10 |
| 5,842,216 | 11/1998 | Anderson et al. | 707/203 |
| 5,892,909 | 4/1999 | Grasso et al. | 709/201 |
| 5,893,114 | 4/1999 | Hashimoto et al. | 707/200 |
| 5,930,471 | 7/1999 | Milewski et al. | 709/204 |

OTHER PUBLICATIONS

"Delphi's Custom Forum", http://www.customforum.com/features.html, pp. 1.
"Ceilidh's Lilikoi forum", http://www.lilikoi.com/features.html, pp. 5–6.
"Source: Installation: Hypernews gateway to Email", http://www.hypernews.org/HyperNews/get/hypernews/email.html, pp. 1–2.
"Microsoft® BackOffice™ Building Exchange™ and Outlook™ Solutions", http://www.microsoft.com/exchange/...yment/collabsolutions.htm#Building, pp. 1–2.
Lotus Institute, "Supporting Teams with Collaborative Technology", http://www2.lotus.com/institute.ns, pp. 1–3.
Lotus Institute, "Lotus TeamRoom", http://www2.lotus.com/institute.ns, pp. 1–2.
"Announcing CREW™", file:///A|/CREWINTR.HTM, pp. 1–2.
"The New Way to Share Workgroup Information", file:///A|/NETSCA~2.HTM, pp. 1–5.
PointCast Network, "the most exciting way to get your news", http://www.pointcast.com/whatis_fromhome.html, pp. 1–2.
Wayfarer, "INCISA™—Bridging the Gap", http://www-.wayfarer.com/products/default.htm, pp. 1–2.

*Primary Examiner*—Thomas C. Lee
*Assistant Examiner*—Ilwoo Park
*Attorney, Agent, or Firm*—Michael A. Gollin; Venable

[57] ABSTRACT

A system and method for communicating information among members of a distributed discussion group having peripheral communication devices involves communication between the peripheral communication devices and a central agent. The central agent receives and stores messages intended for at least one other group member. It creates a notice informing the at least one other group member that such a message exists and containing a channel (e.g., a hyperlink) directly to the memory location of the message. The at least one other group member may then elect to retrieve the message and may also elect to reply to the message. Such replies are transmitted from the peripheral device of the at least one other group member to the central agent, where it is stored and associated with the original message. Messages are retained in memory, thereby causing discussions to be maintained.

32 Claims, 4 Drawing Sheets

CENTRIFUGAL COMMUNICATION AND COLLABORATION METHOD

BACKGROUND OF THE INVENTION

This invention relates to communication and collaboration tools which allow groups to share information across time and space using computer and other communication channels. The inventive method may be incorporated into the design of products such as groupware software and communications services.

The conventional approach to the design of communication and collaboration products, especially of groupware, is a centripetal method, i.e., group members are required to go to a central area in order to retrieve and exchange data and information. For example, in the Internet, group members need to converge on a server in order to communicate and collaborate.

The previous approaches taken in this field can be categorized in two different product groups:

(1) Centripetal method: This method is seen in all of the following products: IBM's Lotus Notes and Domino; Microsoft's Exchange and NetMeeting; Netscape's Virtual Office by Concentric; Radnet's Webshare; Novell's GroupWise; Thuridion's Crew; IntraACTIVE's In Tandem; Linkstar's HotOffice; Changepoint's Involv; Internet Media Inc.'s 3-2-1 Intranet; and others. All of these products require group members to remember to go to a central area (a server) in order to retrieve and exchange data and information. This centripetal design leads producers to develop products by increasing the speed of connection and facilitating access to the central site of communication and collaboration. Using the client-server infrastructure, products are either proprietary servers, enhanced software clients, or both.

(2) Narrowcasting method: This method is seen in all of the following products: PointCast's Client and Server; Marimba's Castanet; Progressive Network's Real Clients and Servers; Microsoft's NetShow; Netscape's Browser and Media Server; Wayfarer's INCISA; and all listserve products. All of these products use the narrowcasting model of one-to-many communication. Group members (many) have to remember to "tune-in" or attend the narrowcasted content served by a central site (one), without knowing whether or not new or relevant information is there.

Both the centripetal and narrowcasting approaches suffer from the disadvantage that group members have to report and remember to report to a central area for communication and collaboration. While they have not failed as models, they have failed to anticipate problems associated with the information age such as information glut and competition for attention. Prior art methods assume that value is added by improving the way group members go about retrieving information that updates at a central location. Collaborative value is stored in the central repository. Group members still must actively go to the central resource to get any information or value from the group. For example, in the Internet, a group member would need to remember to log into a server for a videoconferencing appointment at a designated time. It would be an improvement to such a system for appointments and reminders for appointments to be "pushed" to the group member's awareness via e-mail with a Web hyperlink to the videoconference, via a narrowcast of the appointment, or other technologies that drive the information outward to the group member.

In the digital era, the computer has increasingly become a substitute for physical presence and interaction. Designers, however, have focused on providing cheaper and quicker access and offering additional functionality such as manipulation of the data and information sought. In the attempt to mimic human interaction such as congregating in a town hall for a meeting (a centripetal method) via electronic means, the power of the electronic medium to conduct the meeting outside of the town hall has been ignored.

SUMMARY OF THE INVENTION

The invention, referred to in some of its aspects as a Centrifugal Communication and Collaboration Method (CCCM), reverses the established centralized design of communication and collaboration products especially of groupware software. CCCM "pushes" out to group members the data and information contained in a central area. This centrifugal flow is distinct from the current centripetal design of such products, and provides numerous advantages.

A centrifugal arrangement improves the ability of groups to communicate, collaborate, and exchange information because of its focus on the individual group members rather than a central meeting site. CCCM creates value in interactive group-oriented software applications by distributing the accumulated group knowledge and activity to the individual group members, rather than forcing the group members to go to the central source of data and information where the wealth of the group is stored. Previous applications focused on better, cheaper, and faster ways to bring group members together in a central location. CCCM focuses on using the interactive capabilities of networks to maintain value among the group members, not only at a central repository of information and data.

The active, centrifugal delivery to users of updated information relevant to the members, such as the actions of other group members, the status of their pending group activities, the status of their requested information, etc. simplifies the process by which group members use software programs to gain information over networks. Since the information is pushed, there is minimal need to converge at a central repository.

The prior art model is a centripetal model. Individual users are attracted to or pulled into that central place. The value added by previous software programs has been to make the access easier and cheaper and to improve the manipulation of data.

With CCCM, the dynamic is a centrifugal push, the opposite of the prior art model. The flow of information among members of a group using CCCM-enabled communication and collaboration software is outward in direction. CCCM takes the value of the central resource out to the individual users. The members must converge at the centrifugal core only briefly. They are notified when they must do so, and their convergence is facilitated by shortcuts that make it easier to converge. Collaborative activity is moved away from the central core out through the network to the user's peripheral location. For example, in the Internet, group members automatically receive from a server the data necessary to communicate and collaborate as a group.

CCCM is an integrative method. Using a computer network, it employs software code and servers to distribute content. In an internetworked environment, if group collaboration software resides together with an HTTP server, then pushing out the group-generated information by e-mail employs a mail server, a network connection of all group members, and software code within the group collaboration software that calls on the mail server to push content. Or, if the group-generated information is distributed by narrowcasting, then a narrowcasting server may be used from which narrowcasting clients of group members receive information feed. The group collaboration software, through added software code, then communicates with the narrowcasting server to deliver group-generated information to group members.

As distinguished from other group-oriented software, CCCM reverses the basic assumption about how group value is created and information is shared. Rather than focusing on bringing group members into a central location in a better, cheaper, and faster way, CCCM empowers the users by providing them information right where they are and leaves them to decide whether or not to go to the central site at all.

As distinguished from other uses of "push" technology, the content in CCCM is provided and continuously changed by the group members. The traditional push system is broadcasting, such as television and radio. In this traditional model, preset content is sent to all viewers who have means to receive it, such as TV or radio. Viewers must be there at the same time as the broadcast to receive the content they want, or they must record it at the time of broadcast.

The general Internet model of push is narrowcasting. As with broadcasting, the source(s) of content are decided by the narrowcaster, and filtered according to the users' predetermined criteria as to what will be received.

By contrast, the content of CCCM that is continually being "pushed out" is not a standard collection of information selected by a central narrowcaster, but is a custom mix of information that remains in flux. The information that is pushed is created and continuously modified by the group members themselves. Messages and other information are unique to and generated by group members, and are determined by the role of that member in the group.

Rather than substitute an electronic model for the physical model of a meeting place, CCCM enhances the model of group interaction by taking advantage of the possibilities of virtual and digital communication and collaboration. While all other models took the previous "real world" example of a meeting hall, substituted it in cyberspace, then improved upon the substitute, CCCM uses the power of electronic methods to provide centrifugal flow that enhances the physical model.

CCCM removes the need for individuals to gather at a central location to find out what is there, what has changed since they were last there, and what they can do there. All group value no longer resides in the central resource. CCCM takes the dynamic group information from the center as it is changing with the contributions of its diverse members and distributes it out to those members.

A system for communicating information among members of a group comprises for each group member, a peripheral device capable of transmitting and receiving information; and a central agent comprising two-way links to the peripheral devices capable of receiving and transmitting information, a notice generator triggered by an information input from an inputting member directed to a receiving member, the notice generator generating a notice for the receiving member, and pushing the notice to the peripheral device of the receiving member only if the member is one to whom the associated information input was directed, a central storage medium in which the information input is stored, and an access channel of the link by which the receiving member may receive the information input only if the receiving member responds to the notice.

The access channel is preferably a hyperlink URL in an e-mail embodiment of the invention.

The notice generator may push the notice immediately or at the end of a predetermined period, when all notices generated during the preceding period are pushed together. The notice preferably comprises a summary of the information input, and a link to the information input on the central database. The notice generator may push notices via e-mail, narrowcasting, or a combination. Access to the central agent preferably requires using a password, and information inputs and notices may be encrypted.

The links may form a computer network, a cable network, a telecommunications network, a wireless network, or a combination. The central agent may reside as a program operating on at least one of a network server, an internet, an intranet. The inputs are preferably retained in the central storage medium as a database archive for a predetermined period. The system may comprise a network server farm including a server selected from the group consisting of groupware, a video server, an audio server, a chat server, and a news server.

A method for communicating information among members of a group having peripheral devices capable of transmitting and receiving information comprises providing a central device capable of receiving information from the peripheral devices and transmitting information to the peripheral devices, linking the central device to the peripheral devices, when a first information input is transmitted from the peripheral device of a member of the group directed to at least one other member of the group, centrally receiving the first information input, associating the first information input with the at least one other member, preparing a notice of the first information input for the at least one other member, pushing the notice to the peripheral device of the at least one other member, and centrally storing the first input such that when the at least one other member receives the notice, the at least one other member can retrieve the first information input at the respective peripheral device, and can respond by transmitting a second information input, and minimizing the information transmitted to the peripheral devices by (a) pushing a notice to a member only if the member is one to whom the associated information input was directed, and (b) transmitting an information input to a member only if the member responds to a notice.

The first information input is typically directed to a plurality of other members, and the second information input may be directed to the first member, another member, or a plurality of members. The method may further comprise allowing a person to join as a member of the group by forming a link with the person, and inviting a person to join as a member of the group.

In another embodiment, a computer readable medium comprises a program for carrying out the method according to the invention.

Further objectives and advantages will become apparent from a consideration of the description and drawings.

BRIEF DESCRIPTION OF THE DRAWINGS

The invention is better understood by reading the following detailed description with reference to the accompanying figures, in which like reference numerals refer to like elements throughout, and in which:

FIGS. 3-A to 3-C show flow charts for the asynchronous events in a responsive, rapid interaction among three individual members of a group. FIG. 3-A shows the flow of information from the initial input by member P1. FIG. 3-B shows a response by member P2 directed to member P1. FIG. 3-C shows a response and comment by member P3, directed to members P1 and P2.

FIGS. 4-A and 4-B show flow charts for the events in a slower interaction among three individual members of a group. FIG. 4-A shows the flow of information received at separate times from each of the members P1–P3. FIG. 4-B shows the flow of information periodically pushed to the members.

DETAILED DESCRIPTION OF THE PREFERRED EMBODIMENTS

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Figure 1:
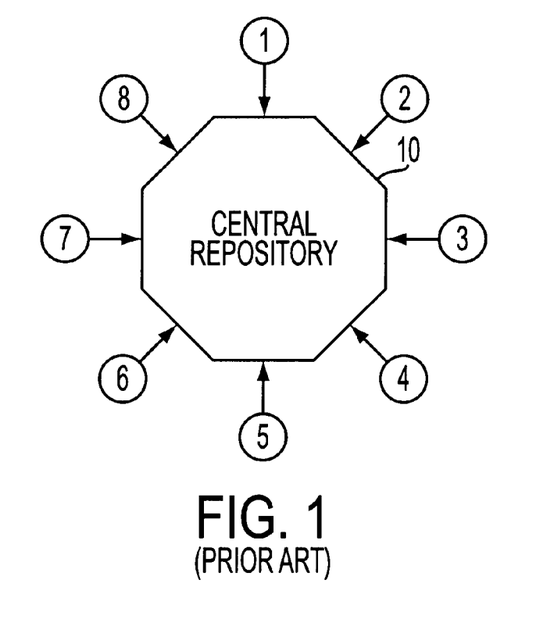
FIG. 1 illustrates a prior art model for centripetal communication and collaboration in a group.

In the prior art as shown in FIG. 1, an eight member group is depicted as circles 1–8, connected to central repository 10. Each user must converge on the central repository 10 to obtain information. If a member does not converge, the member has no access to information that is contained in central repository 10, and no knowledge of whether the information in repository 10 has been changed or updated, and has no way of knowing if any new information is relevant to that particular member. Convergence must be done on a "blind " basis, and is typically done periodically, such as every day or twice a day whether needed or not. Central repository 10 is essentially a database, presenting all information and making it available in a standardized fashion periodically, such as every day or twice a day whether needed or not. Central repository 10 is essentially a database, presenting all information and making it available in a standardized fashion to each member to access and review. The information may be filtered to the individual members, but it must all be stored centrally for such a system to operate effectively.

Figure 2:
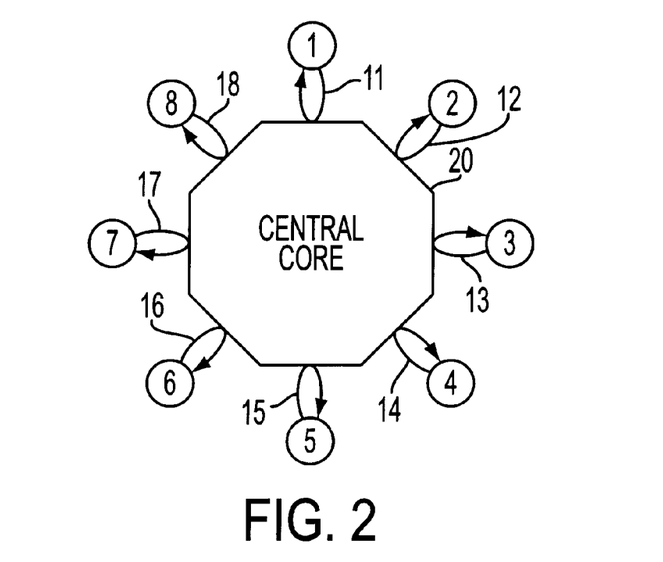
FIG. 2 illustrates the centrifugal communication and collaboration method of the invention.

In a schematic depiction of the invention as shown in FIG. 2, an eight member group is shown oriented around central core 20. Each member has a unique flow of information sent to and received from the central core 20, depicted as individual curved arrows 11–18. Members are notified when relevant information is posted at the central core 20, and may then retrieve the information knowingly. They need not converge blindly on the central core. In addition, because information is tailored and directed to individual members, the arrangement of information at the central core does not need to be a standardized database available to all members.

Preferred embodiments of the invention include the following.

(1) Software intended for use by groups, enabled with CCCM by programmed code intended to push out group-generated information by e-mail, narrowcasting, and other such distribution methods. For example, a group discussion software contains software code that allows discussion content to be e-mailed to the entire set or a subset of participants. An additional program may run at a predefined interval to notify participants of what content is new, what has been read and what has not, or whether or not they have been requested to respond to a particular comment. The individualized e-mail contains the content plus a mouse-clickable Web hyperlink to the message itself from the central server and/or to the entire discussion. The Web hyperlink may in itself open a videoconference, or the Web hyperlink may open a window that contains channelized connections not only to the discussion and videoconference, but also to the schedule and address book of the group member. Another example is a group scheduling software linked to a narrowcasting system that activates a narrowcasting client which then narrowcasts, say, the events of the day or of the month, or that an appointment is about to become due, or that an Internet presentation is about to begin, or that someone has replied to a comment in a group discussion. Both e-mail and narrowcasting can be done in multimedia, such as text, audio, video, and images.

(2) CCCM can be used in non-computer-based networks, provided there is bi-directional exchange of information, including telecommunication systems, newer versions of cable-based networks, wireless networks and others. The invention does not much depend on how the network is linked. What is important is that each database record or field has a URL or similar "retrievable handle" that can be accessed for retrieval by the network, and that this URL or handle can be "pushed" in various ways (like e-mail) so that following (or clicking on) the link will retrieve the database record or field.

The variations occur in the technology used to distribute centrifugally group-generated information. Distribution may occur by e-mail, by narrowcasting, and by other electronic means. According to the invention, there is a method to distribute group-generated information to group members, without requiring them to converge at a central area, and the method is selective and deliberate as to what information is being delivered. Users need not remember to go to a central site for collaboration. CCCM makes participation among users more convenient and improves communication and collaboration products which are currently in existence and which may be developed in the future.

According to the invention, groups may be self-initiated. In other words, in an internet embodiment, one person can identify e-mail addresses for a desired group of colleagues, friends, or family, name the group, and provide a uniform resource locator (URL) for a group conference. The system pushes an e-mail notice to the desired group, with the URL. The recipients, by clicking on the URL, are brought to a conference area. In synchronous mode, they can communicate in streaming conversation, and can scroll through messages. In asynchronous mode the members may participate and return at any time. If a member has not returned for a predetermined time, a notice may be pushed to the member (a) reminding them that a response is desired, (b) indicating that a new message is there, or (c) providing a summary of recent activity.

Figure 3A:
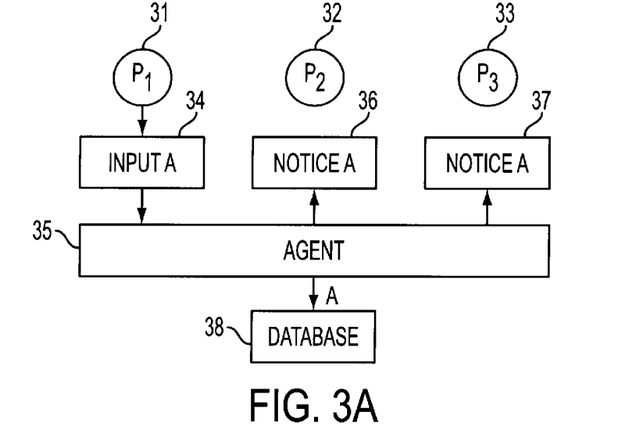
Figure 3B:
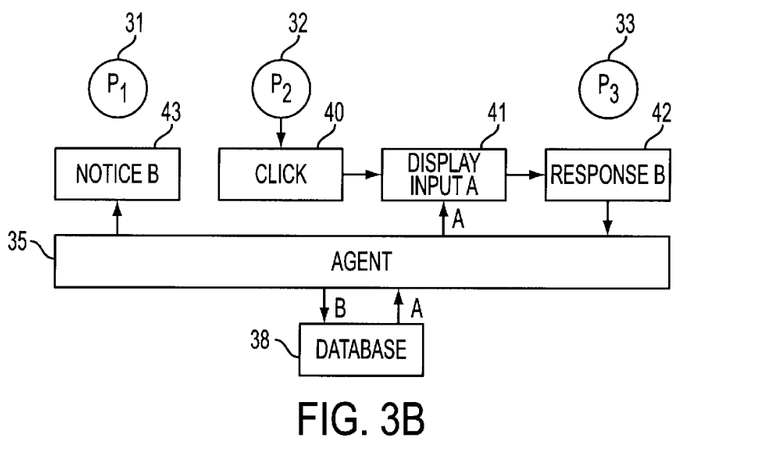
Figure 3C:
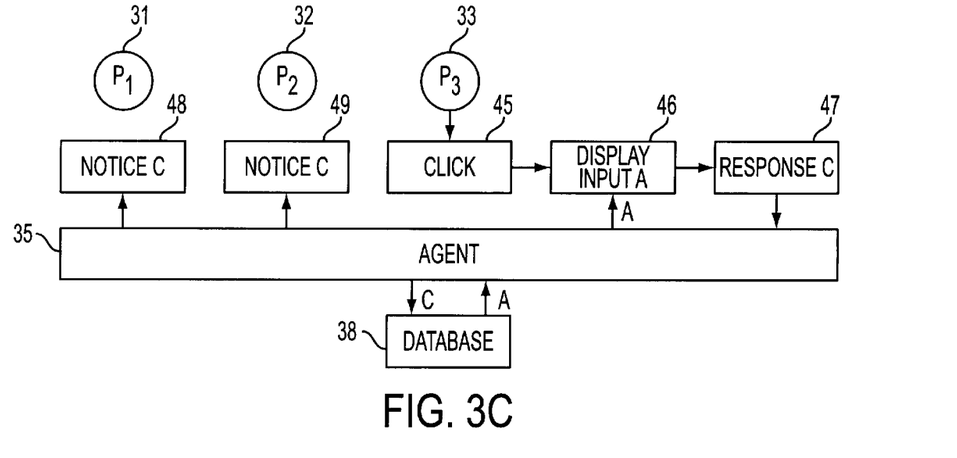

An e-mail driven embodiment is shown in FIGS. 3-A to 3-C. These flow charts represent a responsive continuous interaction among three individual members of a group. Although the events are asynchronous, they may be relatively rapid. Throughout, the agent identifies and pushes the appropriate URLs to the appropriate people. In FIG. 3-A, member Person 1, identified as circle 31, initiates a session by providing an initial input A in a peripheral device such as a personal computer, as identified by box 34. In this example, input A is a question for members Person 2, identified as 32, and Person 3, identified as 33. The question could be "What is the status of Project X?" Intelligent agent 35 receives input A from member Person 1, selects the members to whom the input is relevant, in this case Person 2 and Person 3, and pushes and posts notice of activity with hyperlink at the peripheral computers 36 and 37 for members Person 2 and Person 3. In addition, the intelligent agent 35 stores input A on the central database 38 as database record A.

In FIG. 3-B, member Person 2 (box 32) receives notice A 36 as in the previous figure, and responds by clicking the hyperlink, box 40. This brings input A directly to member Person 2 from the central database, and displays the question "What is the status of Project X?" as shown in box 41. Member Person 2 provides a status report to Person 1, which may include text, graphics, video, and audio, and inputs the report as input Response B, shown as box 42. Agent 35 selects Person 1 as the relevant member, pushes and posts notice B with hyperlink shown as box 43 on the peripheral device of Person 1, and stores input B as database record B in central database 38.

In FIG. 3-C member Person 3 provides a response and comment directed to both of the other members. Person 3 responds to notice A by clicking the hyperlink, box 45. This brings input A directly to Person 3 from the central database, and displays the question "What is the status of Project X?" as shown in box 46. Member Person 3 provides a different status report, input C, directed to both members Person 1 and Person 2, shown as box 47. Agent 35 selects members Person 1 and Person 2 as the relevant members, pushes and posts notice C with hyperlink shown as box 48 and 49 on the peripheral device of Person 1 and Person 2, and stores input C as a database record in central database 38.

Figure 4A:
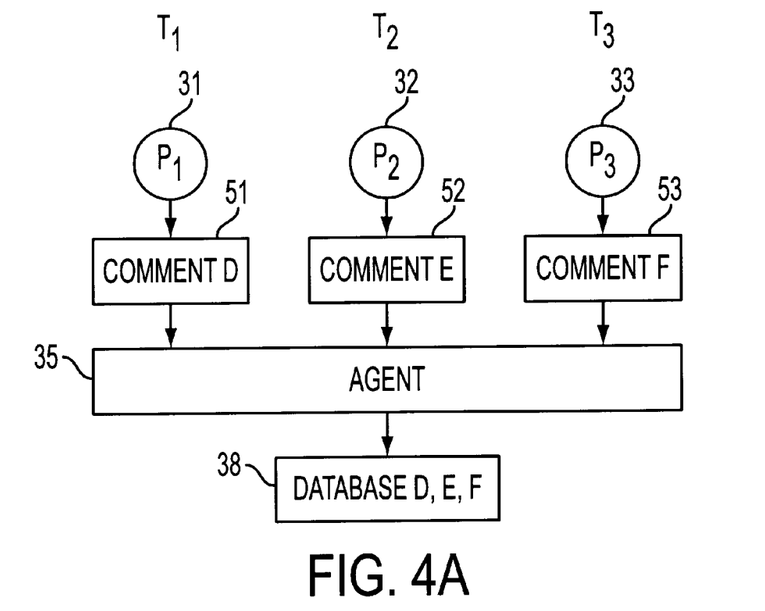
Figure 4B:
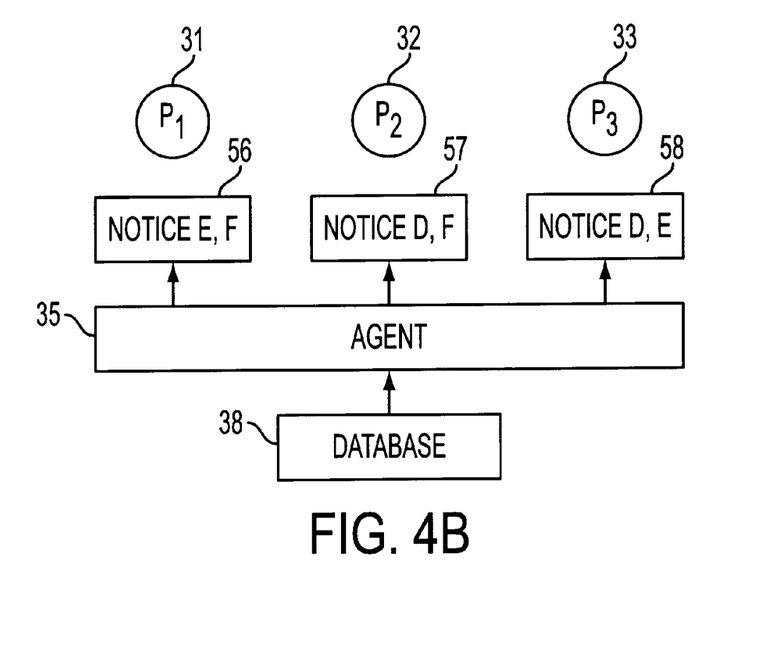

FIGS. 4-A and 4-B show flow charts for a more extended asynchronous interaction among three individual members of a group with a periodic push setting. In FIG. 4-A, at time T1, member Person 1 submits input comment D, shown as box 51. At time T2, Person 2 submits input comment E, shown as box 52. At time T3, Person 3 submits input comment F, shown as box 53. Inputs D, E, and F are each intended for the other group members. As each of the inputs is received, agent 35 selects the intended recipients, and stores the inputs in central database 37 as records D, E, and F for periodic push and notification. The push period can be any desirable period such as hourly, daily, or weekly. In some applications the push period may be minutes, seconds, or less.

In FIG. 4-B, after the elapsed predetermined period, at time T4, such as the next day if the system is set for daily notification, agent 35 pushes and posts individualized notices at the peripheral device of each member. Members do not receive notices of their own inputs. Notice 56 for Person 1 refers to inputs E and F by Persons 2 and 3. Notice 57 for Person 2 refers to inputs D and F by Persons 1 and 3. Notice 58 for Person 3 refers to inputs D and E by Persons 1 and 2. If there are eight members of the group in this example, members 4–8 receive no notification. Thus, in this approach, members 1–3 are notified that there is information, and provided with a direct link to the central database to retrieve it. Other members do not need to take any action because there is no relevant new information for them, and they know that by the absence of a notice. In addition, the members for whom there is relevant information are not burdened by a constant flow of information as with a list-server, and are shown only information relevant to them.

Figure 5:
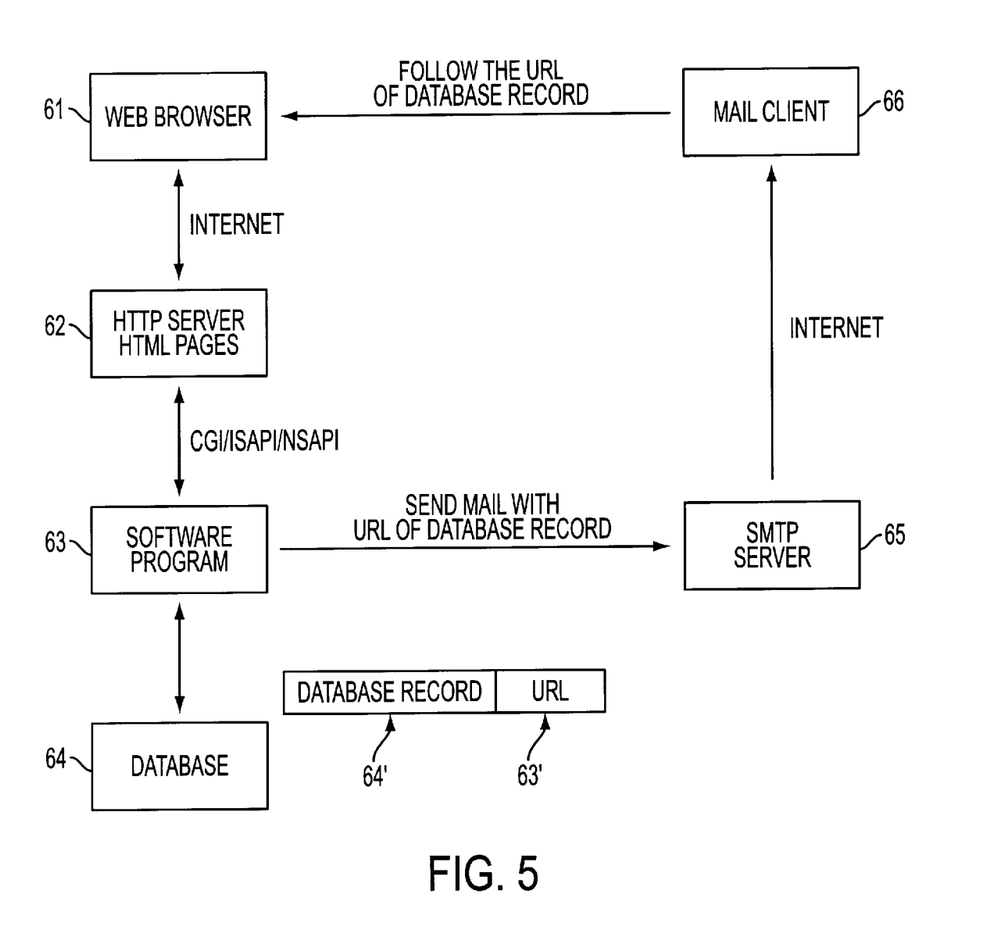
FIG. 5 is a flow chart of information flow in a system according to the invention.

In FIG. 5, the software structure integral to the system is shown. Centrifugal access programming for intelligent agent 63 may be written according to conventional programming principles, and may be provided by a "middleware" product such as Radnet's Webshare (Cambridge, Mass.), Allaire's ColdFusion (Cambridge, Mass.), SilverStream's Web Application Platform (Irvine Calif.), or BlueStone's Sapphire/ Web (Mount Laurel, N.J.). Internet-connected Web-browser (s) 61 accesses HTTP server(s) 62 and is allowed by means of centrifugal access software program 63 to access, for example, the database 64 to obtain a record of a comment 64' in a bulletin board-style Web discussion. The intelligent agent (63) retrieves the record 64' from database 64 and presents it in HTML format with URL 63' to SMTP mail server 65, and thence to mail client 66.

If the user clicks to respond to the record of the comment in database 64, and to notify the author who made the previous comment of this new response, the mail sent to notify this previous author must contain the URL 63' of the actual database record 64' of the response, as follows. Upon reading the e-mail in 66, following or clicking on the URL 63' will retrieve the new response record 64' automatically from the database 64, after clearing applicable authentication procedures such as password clearance. In a similar fashion, if software agent 63 were running overnight counting a user's number of unread messages in a bulletin board-style Web discussion from a database 64, the agent's 63 e-mail report to the user 66 must contain the URL of the actual database record of one or more of the unread messages so that following or clicking on the URL will retrieve one or more of the unread message records (1) automatically from the database (4) after clearing any authentication procedures.

In this embodiment, HTTP server 62, intelligent agent 63, database 64, and SMTP server 65 collectively establish the central agent. Intelligent agent 63 is the notice generator, and the SMTP engine 65 of a mail server is used as the notice sender if an e-mail push is used.

It is apparent from these examples that the intelligent agent is interposed between the member users and the central database, in contrast with conventional centripetal methods of collaboration. As a result the central database need not be complete. Indeed, once an input has been pushed to all intended recipients, the database could be purged, although in practice it may be preferable to keep a backup record of transactions in the group for at least a predetermined period (e.g. one month).

In a list-server, members sign up to join the group independently and can remove themselves at will. Thus, no member can control the presence of the others. The list is formed individually by the sign up of each recipient. According to a preferred embodiment of the invention, in contrast, each member can push a notice to any other person available on the internet via an e-mail message, to select an individualized and personalized group without requiring routing through a central list-server. Moreover, the central database according to the invention can be used to provide a threaded and scrollable record of relevant inputs, as opposed to the excessive number of individual e-mail messages in a list-server, which are not threaded or scrollable. The inventive system is a whole-loop database and network. Also, list servers generally do not use a database. A distinctive aspect of the invention is "pushing" the URL (or retrievable handle) of the database record or field that needs to be seen in order to present it to the user.

According to the invention, the pattern of pushing that is done may depend on the following factors.

(1) the list of people identified by the inputting person (2) if the people identified are not already members of the group, whether they join the group, (3) whether there has been new activity relevant to a particular member, (4) whether there has been a response to a particular input.

(5) a predetermined update frequency

In a preferred commercially viable embodiment, a hypothetical group includes members 1, 2, 3 . . . n at n different locations. Each is given an e-mail notice of a group meeting, either asynchronous or scheduled at a particular time. At that time, or indidually, they each re-open the e-mail message and follow a hyperlink that fires up a web browser and takes them directly to an e-meeting center, in this case a web page where they may converge. They provide a password, and join.

For an on-demand conference, members can read and post messages, read and post files, and publish and attend presentations and lectures. For a live conference, members communicate and collaborate interactively in real time via video, audio, screen sharing, chat, wireboard, and so on.

The embodiments illustrated and discussed in this specification are intended only to teach those skilled in the art the best way known to the inventors to make and use the invention. Nothing in this specification should be considered as limiting the scope of the present invention. Modifications and variations of the above-described embodiments of the invention are possible without departing from the invention, as appreciated by those skilled in the art in light of the above teachings. It is therefore to be understood that, within the scope of the claims and their equivalents, the invention may be practiced otherwise than as specifically described.

What is claimed is:

1. A system for communicating information among members of a distributed discussion group comprising:

for each group member, a peripheral device capable of transmitting and receiving information; and a central agent comprising:

two-way links to the peripheral devices capable of receiving and transmitting information, a notice generator, a notice sender, and a central storage medium able to store information inputs from members, the central storage medium storing a first information input from an inputting member directed to at least one receiving member; the notice generator, responsive to said first information input, being able to generate a notice selectively for the at least one receiving member and to push the notice to the notice sender, the notice comprising a channel to a memory location of said first information input in the central storage medium; and the notice sender, responsive to the notice pushed from the notice generator, being able to send the notice selectively to the peripheral devices of the receiving member; whereby the receiving member can access said first information input directly using the channel in the pushed notice; the central storage medium being further able to store a second information input from a member in response to said first information input and associate it with said first information input while subsequently retaining said first information input; the notice generator, responsive to said second information input, being able to generate a second notice selectively directed to at least one other member of said discussion group, which at least one other member may or may not include said inputting member, the second notice comprising a channel to a memory location of said second information input in the central storage medium, and said second notice being pushed to said notice sender; said notice sender, responsive to said second notice being pushed, being capable of sending said second notice to the peripheral devices of the at least one member to whom the second notice is selectively directed; and the central storage medium being further able to store a third information input from a member in response to said second information input and associate it with said first and second information inputs while subsequently retaining said first and second information inputs.

2. The system of claim 1, in which the notice generator pushes the notice immediately.

3. The system of claim 1, in which the notice sender pushes the notice at the end of a predetermined period.

4. The system of claim 3, in which all notices generated during the preceding period are pushed together.

5. The system of claim 1, in which the notice comprises a summary of the information input.

6. The system of claim 1, in which the notice comprises a hyperlink to the information input on the central storage medium.

7. The system of claim 1, in which the notice sender is an e-mail server, narrowcasting server, or a combination.

8. The system of claim 1, in which the links form a computer network, a cable network, a telecommunications network, a wireless network, or a combination.

9. The system of claim 8, in which the central agent resides as a program operating on at least one of a network server, an internet, an intranet.

10. The system of claim 1, in which the inputs are retained in the central storage medium as a database archive for a predetermined period.

11. The system of claim 1, in which access to the central agent requires using a password.

12. The system of claim 1, in which information inputs and notices are encrypted.

13. The system of claim 1, further comprising a network server farm including a server selected from the group consisting of groupware, a video server, an audio server, a chat server, and a news server.

14. A method of communicating information among members of a distributed discussion group having peripheral devices capable of transmitting and receiving information, comprising:

providing a central device capable of receiving information from the peripheral devices and transmitting information to the peripheral devices, linking the central device to the peripheral devices, responsive to a first information input transmitted from the peripheral device of a first member of the group directed to at least one other member of the group, centrally receiving and storing the first information input, associating the first information input with the at least one other member, preparing a notice of the first information input for the at least one other member, the notice comprising a channel to a memory location of the first information input, and sending the notice to the peripheral device of the at least one other member only if the at least one other member is one to whom the associated information input is directed, responsive to a second information input by the at least one other member, in response to said notice, centrally receiving, storing, and associating the second information input with the first information input, while retaining the first information input, preparing a second notice of the second information input directed to at least one other member, which may or may not include said first member, the second notice comprising a channel to a memory location of the second information input, and sending the notice to the peripheral device of the at least one other member only if the at least one other member is one to whom the associated information input is directed, and responsive to a third information input by the at least one other member to whom said second notice was directed and in response to said second notice, centrally receiving, storing, and associating the third information input with the first and second information inputs, while retaining the first and second information inputs, preparing a third notice of the third information input directed to at least one other member the third notice comprising a channel to a memory location of the third information input, and sending the third notice to the peripheral device of the at least one other member only if the at least one other member is one to whom the associated information input is directed.

15. A method according to claim 14, in which the first information input is directed to a plurality of other members.

16. A method according to claim 14, in which the second information input is directed to the first member.

17. A method according to claim 14, further comprising allowing a non-member to join as a member of the group, comprising the steps of:

having a member designate said non-member for inclusion in the group; and generating and sending a notice to said non-member, including at least one channel to permit access by said non-member to at least one information input, inviting said non-member to access the distributed discussion group.

18. A method according to claim 17, comprising inviting a person to join as a member of the group.

19. A computer readable medium comprising a program for carrying out the method of claim 14.

20. A system for communicating information among members of a distributed discussion group having peripheral devices capable of transmitting and receiving information, comprising means for centrally receiving a first information input transmitted from the peripheral device of a member of the group directed to at least one other member of the group, means for generating a notice of the first information input, the notice comprising a channel linking the at least one other member to the first information input, means for sending the notice to the peripheral device of the at least one other member selectively if the member is one to whom the associated information input was directed, and means for centrally storing the first information input such that when the at least one other member receives the notice, the at least one other member can retrieve the first information input at the respective peripheral device via the channel, and can transmit to the central receiving means at least one response to the first information input, the central receiving means comprising means for associating the first information input with the at least one response, said means for generating a notice generating, responsive to said at least one response, at least one second notice directed to at least one member other than the member sending the particular response, said notice containing at least one channel linking the at least one other member to said at least one response, and said means for sending sending the at least one second notice to the peripheral device of the at least one member to whom it is directed, said means for centrally storing providing the at least one other member the capability of retrieving the at least one response at the respective peripheral device via the at least one channel, and further associating with said first information input and said at least one response any further responses from said at least one other member to said at least one response.

21. A system according to claim 1, wherein said central storage medium, said notice generator, and said notice sender operate in the same manner as for said second information input in response to said third information input and any subsequent information inputs.

22. A system according to claim 14, wherein the steps of centrally receiving, storing, and associating, of preparing a notice, and of sending the notice are repeated in response to any subsequent information inputs.

23. A system for communicating information among members of a distributed discussion group comprising:

for each group member, a peripheral device capable of transmitting and receiving information; and a central agent comprising:

two-way links to the peripheral devices capable of receiving and transmitting information, a notice generator, a notice sender, and a central storage medium able to store information inputs from members, the central storage medium storing a first information input from an inputting member directed to at least one receiving member; the notice generator, responsive to said first information input, being able to generate a notice selectively for the at least one receiving member and to push the notice to the notice sender, the notice comprising a channel leading to a memory location of said first information input in the central storage medium, said channel containing all information necessary to automatically access said first information input, including authentication information containing a password; and the notice sender, responsive to the notice pushed from the notice generator, being able to send the notice selectively to the peripheral devices of the receiving member; whereby the receiving member can access said first information input directly and automatically using the channel in the pushed notice; the central storage medium being further able to store a second information input from a member in response to said first information input and associate it with said first information input while subsequently retaining said first information input.

24. A system according to claim 23, said channel comprising a URL.

25. A system according to claim 23, said central agent further comprising:
   means for permitting said receiving member access to said central agent via said channel, based on said authentication information; and
   means for accessing said central storage medium to provide said first information input to said receiving member, said means for accessing being logically interposed between said means for permitting and said central storage medium;
   said means for permitting and means for accessing providing automatic and direct access to said first information input using said channel.

26. A method of communicating information among members of a distributed discussion group having peripheral devices capable of transmitting and receiving information, comprising:
   providing a central device capable of receiving information from the peripheral devices and transmitting information to the peripheral devices,
   linking the central device to the peripheral devices,
   responsive to a first information input transmitted from the peripheral device of a first member of the group directed to at least one other member of the group:
      centrally receiving and storing the first information input,
      associating the first information input with the at least one other member,
      preparing a notice of the first information input for the at least one other member, the notice comprising a channel to a memory location of the first information input, said channel permitting automatic, direct access to said first information input by the at least one other member and including such information as is needed to facilitate such automatic, direct access, including authentication information containing a password, and
      sending the notice to the peripheral device of the at least one other member only if the at least one other member is one to whom the associated information input is directed, and
   responsive to a second information input by the at least one other member, in response to said notice, centrally receiving, storing, and associating the second information input with the first information input, while retaining the first information input.

27. A method according to claim 26, said channel comprising a URL.

28. A method according to claim 26, further comprising the steps of:
   using said channel to access a central agent logically interposed between said peripheral devices and a central storage medium in which said information inputs are stored, the step of using being performed by at least one of said members; and
   accessing said central storage medium by said central agent to provide automatic, direct access to said information inputs.

29. A system according to claim 1, said central agent further comprising:
   means permitting access to the central agent by using one of said channels; and
   means for accessing said central storage medium to retrieve at least one of said information inputs and to forward it to a member accessing the central agent using one of said channels, said means for accessing being logically interposed between said means permitting access and said central storage medium;
   said means permitting access and means for accessing providing automatic, direct access to at least one of said information inputs by using one of said channels.

30. A method according to claim 14, further comprising the steps of:
   using one of said channels to access a central agent logically interposed between said peripheral devices and a central storage medium in which said information inputs are stored, the step of using being performed by at least one of said members; and
   accessing said central storage medium by said central agent to provide automatic, direct access to said information inputs.

31. A system for communicating information among members of a distributed discussion group having peripheral devices capable of transmitting and receiving information, comprising:
   means for centrally receiving a first information input transmitted from the peripheral device of a member of the group directed to at least one other member of the group;
   means for generating a notice of the first information input, the notice comprising a channel automatically and directly linking the at least one other member to the first information input, said channel including all information necessary to provide such automatic and direct linking, including authentication information containing a password;
   means for sending the notice to the peripheral device of the at least one other member selectively if the member is one to whom the associated information input was directed; and
   means for centrally storing the first information input such that when the at least one other member receives the notice, the at least one other member can automatically and directly retrieve the first information input at the respective peripheral device via the channel, and can transmit to the central receiving means at least one response to the first information input, the central receiving means comprising means for associating the first information input with the at least one response.

32. A system according to claim 31, further comprising:
   a central means including said means for generating a notice, and further comprising:
      means for permitting said at least one other member access to said central agent via said channel; and
      means for accessing said means for centrally storing to provide said first information input to said at least one other member, said means for accessing being logically interposed between said means for permitting and said means for centrally storing;
   said means for permitting and means for accessing providing automatic and direct access to said first information input using said channel.

* * * * *